（12) United States Patent
Takaya et al.

(10) Patent No.: US 6,290,527 B1
(45) Date of Patent: Sep. 18, 2001

(54) NIPPON TELEGRAPH AND TELEPHONE CORPORATION

(75) Inventors: Masaaki Takaya; Shinji Nagasawa, both of Mito (JP)

(73) Assignee: Nippon Telegraph and Telephone Corp., Tokyo (JP)

(*) Notice: Subject to any disclaimer, the term of this patent is extended or adjusted under 35 U.S.C. 154(b) by 0 days.

(21) Appl. No.: 09/342,469

(22) Filed: Jun. 29, 1999

(30) Foreign Application Priority Data

Jul. 3, 1998 (JP) ................................ 10-188489
Aug. 31, 1998 (JP) ................................ 10-244912

(51) Int. Cl.[7] .................................... H01R 13/627
(52) U.S. Cl. ......................... 439/352; 439/354; 385/76
(58) Field of Search .................... 439/358, 357, 439/350, 345, 352–354; 385/76, 59, 55, 56

(56) References Cited

U.S. PATENT DOCUMENTS

| 4,611,887 | | 9/1986 | Glover et al. |
| 4,857,008 | * | 8/1989 | Kee et al. ............................ 439/352 |
| 5,246,380 | * | 9/1993 | Kodama ............................... 439/354 |
| 5,254,014 | * | 10/1993 | Yagi et al. ........................... 439/353 |
| 5,293,581 | * | 3/1994 | DiMarco ............................... 385/76 |
| 5,481,634 | | 1/1996 | Anderson et al. |
| 5,579,425 | * | 11/1996 | Lampert et al. ....................... 385/59 |
| 5,926,596 | * | 7/1999 | Edwards et al. ....................... 385/78 |
| 6,004,041 | * | 12/1999 | Kunishi ............................... 385/59 |
| 6,017,153 | * | 1/2000 | Carlisle et al. ....................... 385/56 |
| 6,024,498 | * | 2/2000 | Carlisle et al. ....................... 385/56 |

FOREIGN PATENT DOCUMENTS

| 5966221 | 2/1984 | (JP) . |
| 62106204 | 7/1987 | (JP) . |
| 6323629 | 8/1988 | (JP) . |
| 425807 | 1/1992 | (JP) . |
| 2574527 | 10/1996 | (JP) . |

OTHER PUBLICATIONS

"Connectors Evolve for the Premises Market" (Lightwave Special Reports, pp. 39–51, May 1998).

"Connector Market Forecast to Grow Through 2002" (Lightwave Special Reports, pp. 86–89, Feb. 1998).

"Optical Data Communication: Fundamentals and Future Directions", Casimer DeCusatis (Optical Engineering, vol. 37, No. 12, pp. 3082–3099, Dec. 1998.

* cited by examiner

Primary Examiner—Brian Sircus
Assistant Examiner—Hae Moon Hyeon
(74) Attorney, Agent, or Firm—Ostrolenk, Faber, Gerb & Soffen LLP

(57) ABSTRACT

A connector plug can be removably snap-fitted into the adapter which has a cavity into which the connector plug is inserted and a hole for locking the connector plug. The connector plug has: an optical fiber; a ferrule; housing; an elastic engagement piece with an projecting engagement portion and a projecting press portion, the engagement portion being adapted to snap into the hole of the adapter and become locked there when the connector plug is inserted into the adapter; and a stopper for locking the elastic engagement piece from being pressed. A height of the projecting press portion is set almost flush with a surface of the housing of the adapter, or is set almost equal to the height of the receptor portion of the adapter. Therefore, the connector plug can easily be connected to and disconnected from the adapter and its connection with the adapter is not easily broken.

16 Claims, 17 Drawing Sheets

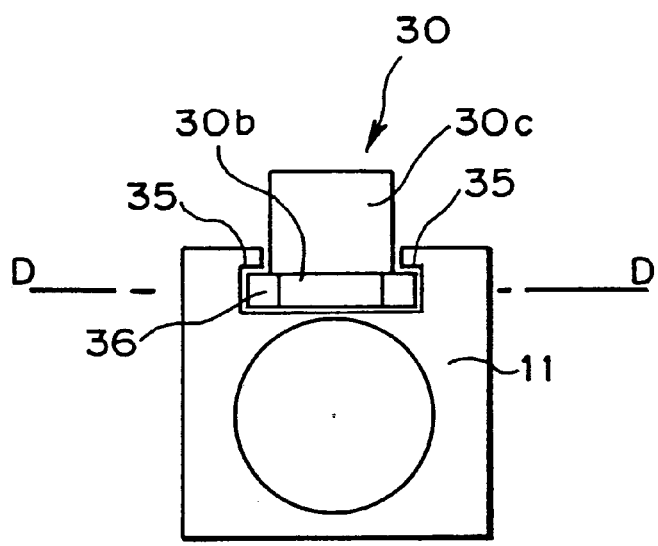
FIG. 13A
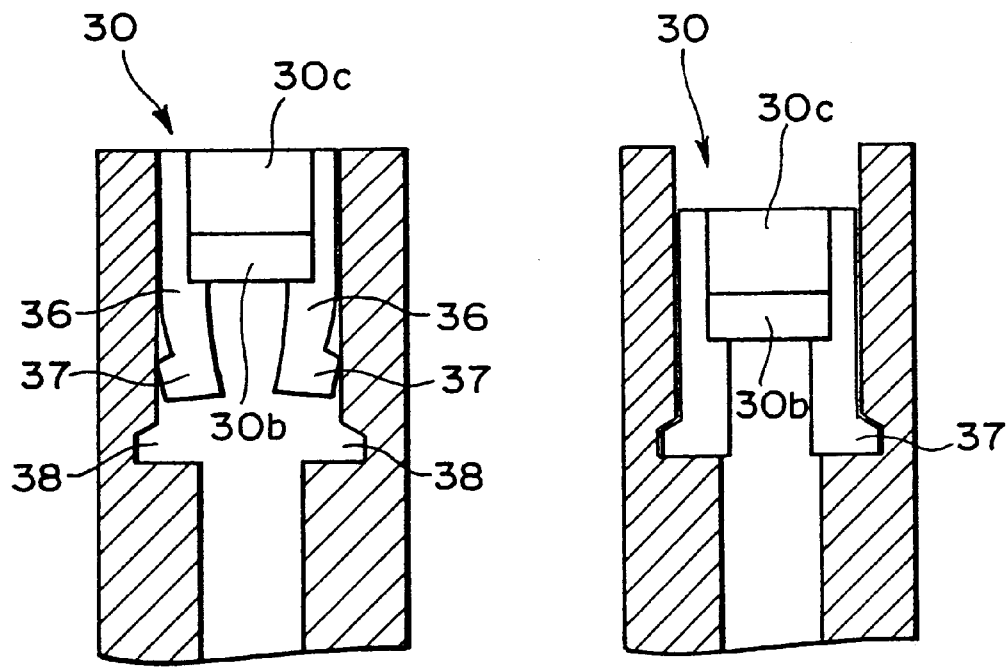
FIG. 13B  FIG. 13C

NIPPON TELEGRAPH AND TELEPHONE CORPORATION

This application is based on Japanese Patent Application No. 10-188489 (1998) filed Jul. 3, 1998 and Japanese Patent Application No. 10-244912 Aug. 31, 1998, the contents of which are incorporated hereinto by reference.

BACKGROUND OF THE INVENTION

1. Field of the Invention

The present invention relates to a connector plug used in an optical connector that connects optical communication cables using single- or multi-core optical fibers.

2. Description of the Prior Art

Optical communication systems have conventionally employed various kinds of optical connectors for connecting optical communication cables. In recent years, an MT (Mechanically Transferable) type connector and an MPO (Multifiber Push-On) type connector capable of being engaged and disengaged simply by a push-pull operation have been proposed as connectors that can easily connect or disconnect optical fiber tapes. These types of connectors all use an MT type ferrule in an optical fiber connecting portion. The optical fiber connectors using the MT type ferrule are constructed so as to be able to easily align the end faces of mating optical fibers by guide pins and are very useful in terms of ease of use, weight and cost.

In recent years, an RJ (Regular Jack) type optical connector has been proposed (for example by U.S. Pat. No. 5,481,634) which incorporates a connector ferrule in an RJ type housing and enables connection and disconnection of optical fibers by an operation similar to the one performed on the electric connector.

The RJ type optical connector applies the connection structure of the electric connector to the optical connector, and its construction is shown in FIG. 17.

The optical connector shown in the figure comprises a pair of RJ type connector plugs 1 (only one of the pair is shown) and an adapter 2. The connector plugs 1 each incorporate a ferrule 4 holding an optical fiber 3 therein. In this optical connector, when the pair of connector plugs 1 are inserted into the adapter 2, end faces of the optical fibers of the opposing connector plugs 1 contact each other, thus connecting the optical fibers 3 of the connector plugs 1.

That is, inserting the connector plugs 1 into the adapter 2 causes an elastic engagement piece 1a provided on one side surface of each connector plug 1 to snap into a recessed portion in the adapter 2, thus holding the connector plug 1 and the adapter 2 in a connected state. The connector plug 1 can be disconnected by pressing a press portion 1c of the elastic engagement piece 1a toward the plug body side while pulling the connector plug from the adapter 2.

With the conventional RJ type optical connector, however, pressing the press portion 1c of the elastic engagement piece 1a easily allows the connector plug to disengage from the adapter 2. Therefore, there is a possibility that the connection may easily be lost as a result of the press portion 1c of the elastic engagement piece 1a contacting external objects. This raises a problem of lack of reliability of the optical connector.

Further, because the elastic engagement piece 1a including the press portion 1c protrudes largely outwardly from the optical connector, cables or the like are likely to get caught by the engagement piece. As described above, inadvertent contact of the elastic engagement piece 1a with other objects will easily result in disconnection.

Another problem is that, when multi-core optical fibers are to be connected by the conventional optical connector, it is difficult to align the positions of the mating optical fibers.

An object of the present invention is to provide a connector plug which can easily be connected to and disconnected from the adapter and at the same time whose connection cannot easily be broken.

SUMMARY OF THE INVENTION

In one aspect of the present invention, a connector plug can be removably snap-fitted into an adapter having a cavity therein for receiving the connector plug and holes for locking the connector plug, and comprises: at least one optical fiber; a ferrule for holding the optical fiber so that each end face of the optical fiber is exposed; a housing for receiving the ferrule and the fiber; and a plurality of elastic engagement pieces extending from a plurality of locations on the housing, the elastic engagement pieces each having a projecting engagement portion, the projecting engagement portions being adapted to snap into the holes of the adapter and become locked there when the connector plug is inserted into the adapter.

The elastic engagement pieces extend, for example, in an axial direction of the optical fiber. Spaces for the elastic engagement pieces to elastically deform are formed between a back surface of each of the elastic engagement pieces and the housing.

Because the connector plug is connected to the adapter by a plurality of elastic engagement pieces, the connected state is prevented from being disturbed inadvertently by contact with external objects, thus improving the reliability of the optical connector.

Further, if the elastic engagement pieces are each formed with a projecting press portion at a rear end portion thereof which is pressed to elastically deform the elastic engagement piece toward its back surface side to unlock the engagement portion of the elastic engagement piece from the hole of the adapter, the connection and disconnection between the connector plug and the adapter can easily be performed. This construction is practically very useful.

Further, if a projection height of the press portion is set almost flush with a surface of the housing of the adapter when the connector plug is inserted into the adapter, or if the adapter is provided with receptor portions that receive the press portions of the elastic engagement pieces by enclosing the press portions around their circumference and the projection height of the press portion is set almost equal to the height of the receptor portion, it is possible to prevent the press portions from becoming entangled with cables or the like and thereby keep the wiring state of the optical cables in good condition.

In another aspect of the invention, the connector plug can be removably snap-fitted into an adapter having a cavity therein for receiving the connector plug and holes for locking the connector plug, and comprises:

At least one optical fiber; a ferrule for holding the optical fiber so that each end face of the optical fiber is exposed; a housing for receiving the ferrule and the fiber; a housing for holding the optical fiber so that an end face of the optical fiber is exposed; an elastic engagement piece extending from the housing, the elastic engagement piece having a projecting engagement portion and a projecting press portion that can be pressed, the projecting engagement portion being adapted to snap into the hole of the adapter and become locked there when the connector plug is inserted into the adapter; and a stopper for locking the press portion of the elastic engagement piece from being pressed; wherein, in a state where the press portion is not locked by the stopper, the press portion is pressed to unlock the engagement portion of the elastic engagement piece from the hole. The elastic engagement piece extends, for example, in an axial direction of the optical fiber, and a space for the elastic engagement piece to elastically deform is formed between a back surface of the elastic engagement piece and the housing.

In this invention, because the stopper locks the elastic engagement piece from being pushed down, there is no possibility of the connector plug inadvertently disengaging from the adapter even when the press portion contacts external objects, thus improving the reliability of the optical connector.

Further, if the stopper is made movable between a locking position where the stopper locks the pressing operation of the press portion and an unlocking position where the press portion is unlocked, the movement of the elastic engagement piece can be locked/unlocked by a simple operation of moving the stopper.

Further, if a stopper locking means is provided which restricts (or locks) the movement of the stopper itself at the locking position, it is possible to reliably prevent the stopper from inadvertently getting displaced and nullifying the locking state. This further improves the reliability of the optical connector.

Further, if the press portion of the elastic engagement piece and the operation portion of the stopper are formed so that they are equal in height and that they together form a continuous surface when the stopper is moved to the elastic engagement piece, then the press portion and the stopper form an integral one-piece geometry with few undulations, thus reliably preventing them from getting entangled with cables or other members.

Further, if the operation portion of the stopper is provided with a means for preventing slippage while moving the stopper, the stopper can reliably be moved with a finger tip, improving the operability.

Further, if an indicator portion that indicates whether or not the press portion is locked by the stopper is provided at such a display position on the housing that when the stopper is moved toward the elastic engagement piece, the indicator portion is exposed and when it is moved in a direction opposite the elastic engagement piece, the indicator portion is concealed under the stopper, it is possible to visually check the locked/unlocked state of the stopper from outside easily, thus assuring reliable locking of the elastic engagement piece at any time.

The above and other objects, effects, features and advantages of the present invention will become more apparent from the following description of embodiments thereof taken in conjunction with the accompanying drawings.

BRIEF DESCRIPTION OF THE DRAWINGS

FIGS. 13A to 13C are diagrams showing an example of a stopper locking mechanism;

DETAILED DESCRIPTION OF PREFERRED EMBODIMENTS (First Embodiment)

Figure 1:
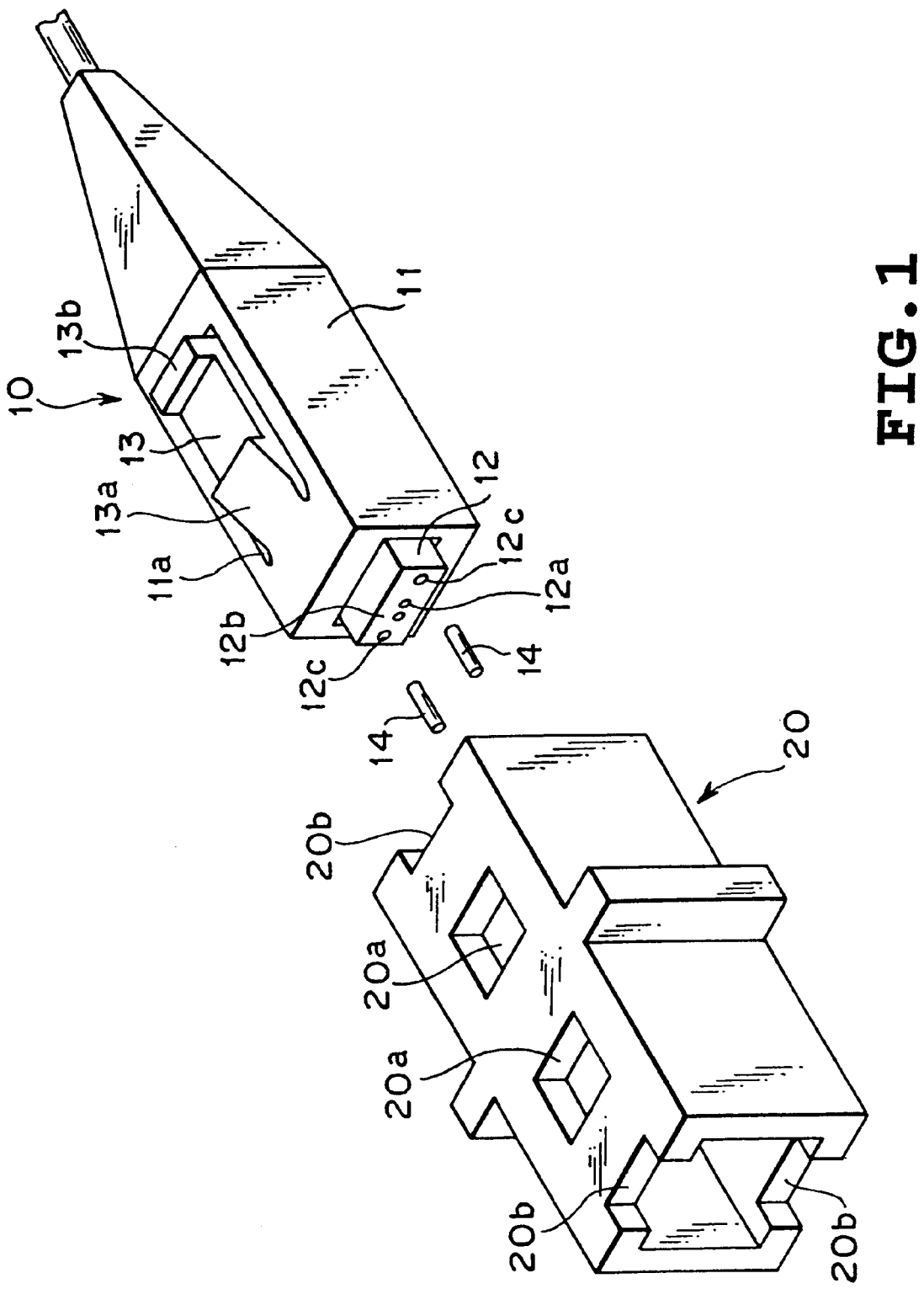
FIG. 1 is a perspective view of an optical connector according to a first embodiment of the present invention.
Figure 2:
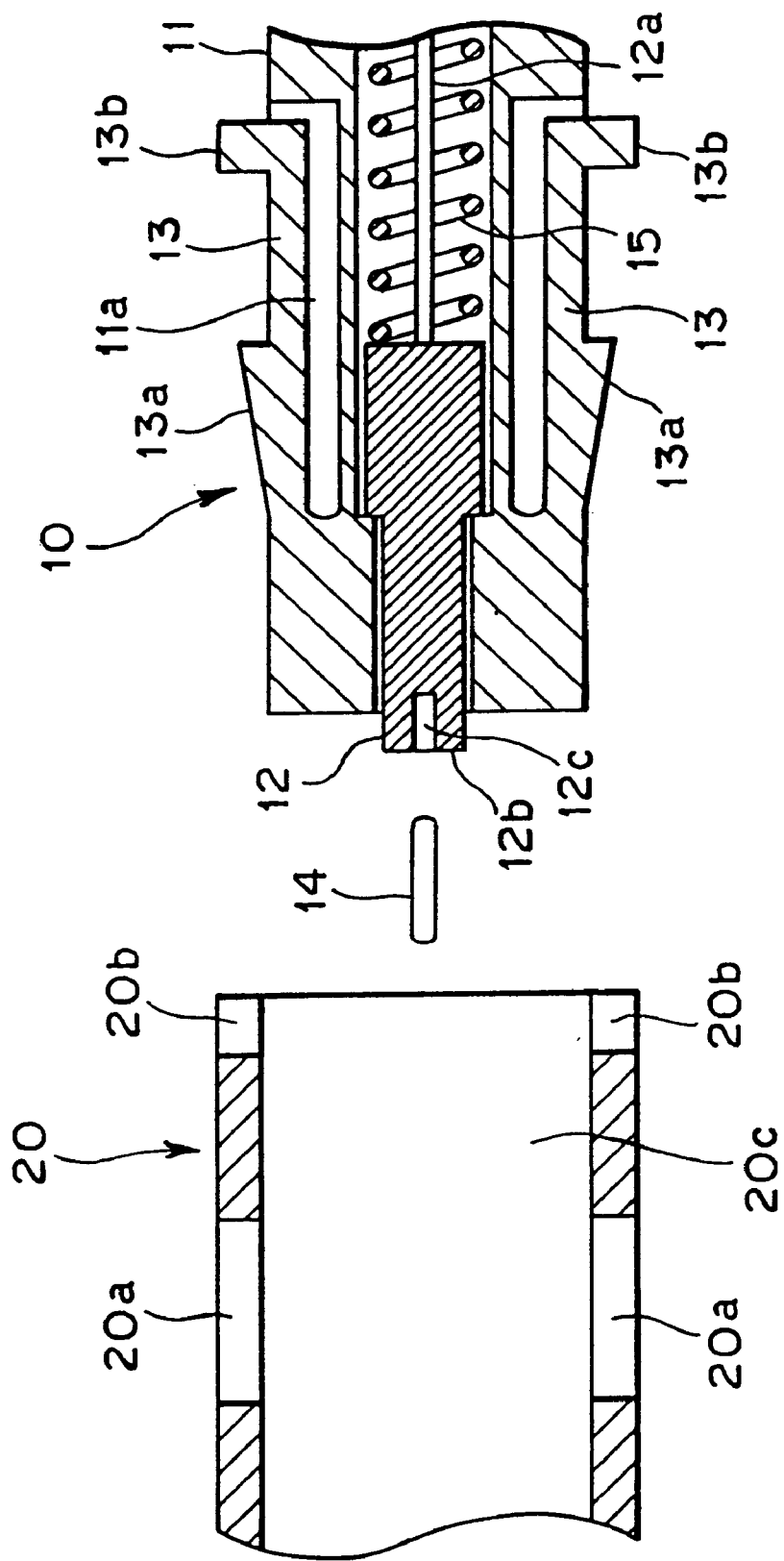
FIG. 2 is a longitudinal cross section of the first embodiment of the optical connector.

FIGS. 1 to 4 represent the first embodiment of the present invention. FIG. 1 is a perspective view of an optical connector, FIG. 2 a side cross section of the optical connector, FIG. 3 a perspective view of the optical connector in a connected state, and FIG. 4 a side cross section of the optical connector.

The optical connector shown in these figures comprises a pair of connector plugs 10 and an adapter 20, and the connector plugs 10 are inserted into the ends of the adapter 20 to establish an optical connection.

The connector plugs 10 each have a housing 11 rectangular in cross section and a ferrule 12 accommodated in the housing 11.

Each of the connector plugs 10 has elastic engagement pieces 13 integrally formed with the housing 11, one on one side surface thereof (upper side in the figure) and one on the other side surface (lower side).

The ferrule 12 is a so-called MT type ferrule that holds two optical fibers (fiber ribbons) 12a. An optical fiber end face 12b of the ferrule 12 is formed with two pin insertion holes 12c, spaced widthwise, in which guide pins 14 are inserted. These guide pins 14 are inserted in the pin insertion holes 12c formed in the optical fiber end face 12b of the other connector plug 10 so that they protrude from the optical fiber end face of the other connector plug 10.

The ferrule 12 is supported in the housing 11 so that it can slide in the optical axis direction, with the optical fiber end face 12b of the ferrule 12 projecting from the end face of the housing 11. In the housing 11 is installed a spring 15 that urges the ferrule 12 toward the outside.

A pair of elastic engagement pieces (elastic hook) 13 extend from one end of the housing 11 toward the other end and are formed elastically deformable (deflectable) into grooves 11a (spaces) formed on the inner side thereof (i.e., deflectable in the vertical direction in the figure). The elastic engagement pieces 13 have an engagement portion (projection) 13a at one end thereof projecting outwardly from the housing 11. The engagement portion 13a is formed, on one end side, with a tapered surface whose height decreases toward the plug insertion direction and, on the other end side, with a surface vertical with respect to the plug insertion direction. The elastic engagement pieces 13 have a press portion (button) 13b at the other end projecting outwardly from the housing 11.

The adapter 20 is formed into a cylinder rectangular in cross section which has a cavity 20c therein in which to insert the connector plugs 10. The one side (upper side in the figure) and the other side (lower side) of the adapter 20 are formed with holes 20a to receive the engagement portions 13a of the elastic engagement pieces 13 and with receptor portions 20b to receive the press portions 13b of the elastic engagement pieces 13. That is, the two holes 20a and the receptor portions 20b are provided respectively at both ends of the adapter 20. The holes 20a, although they are open at the inner and outer surfaces of the adapter 20, may be formed as recesses that do not open at the outer surface.

The receptor portions 20b are formed at the ends of the adapter 20 so as to enclose the circumference of each press portion 13b. When the plug 10 is inserted into the adapter 20, the top surface of the press portion 13b is almost flush with the upper surface of the adapter 20.

Figure 3:
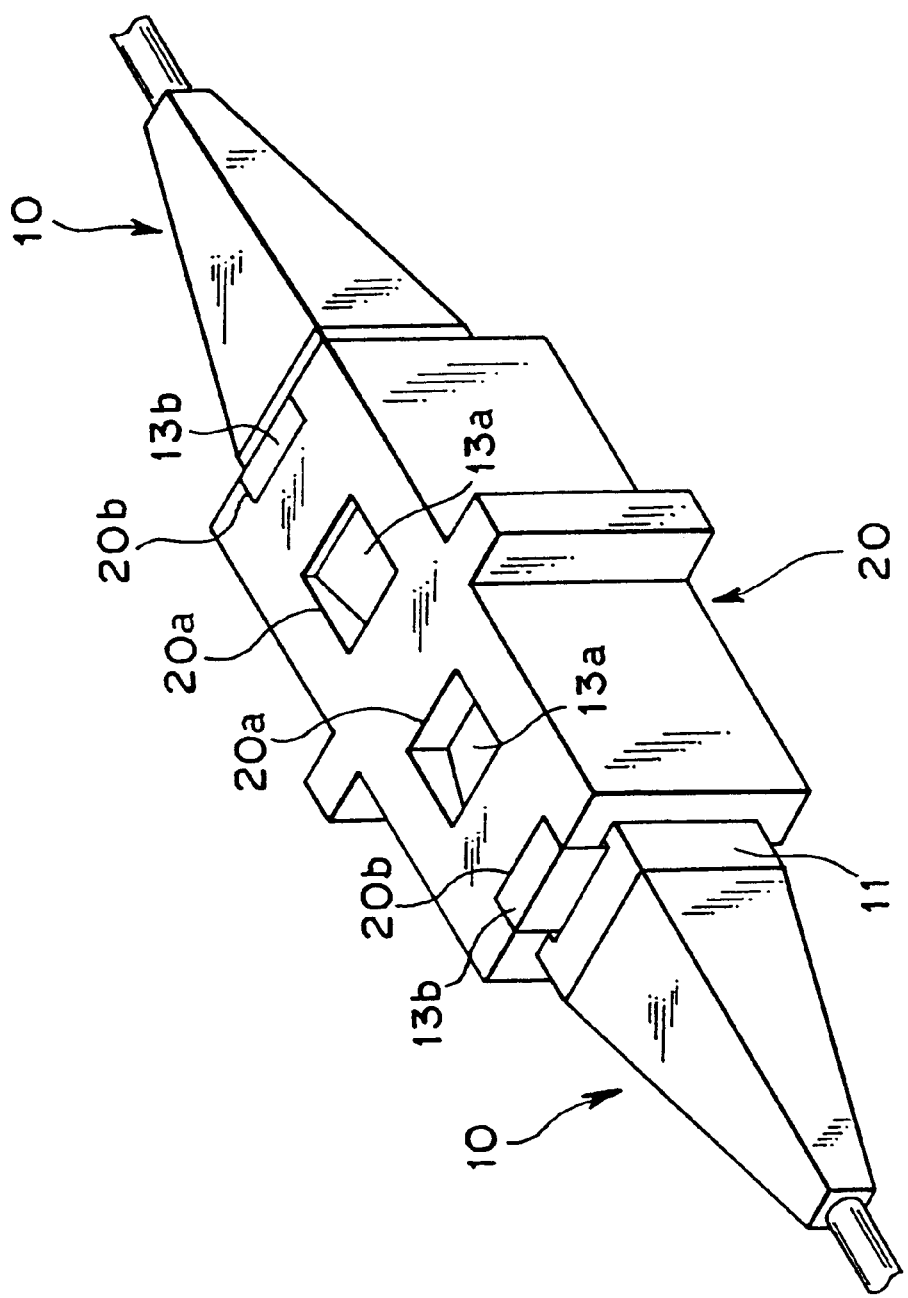
FIG. 3 is a perspective view of the first embodiment of the optical connector in a connected state.
Figure 4:
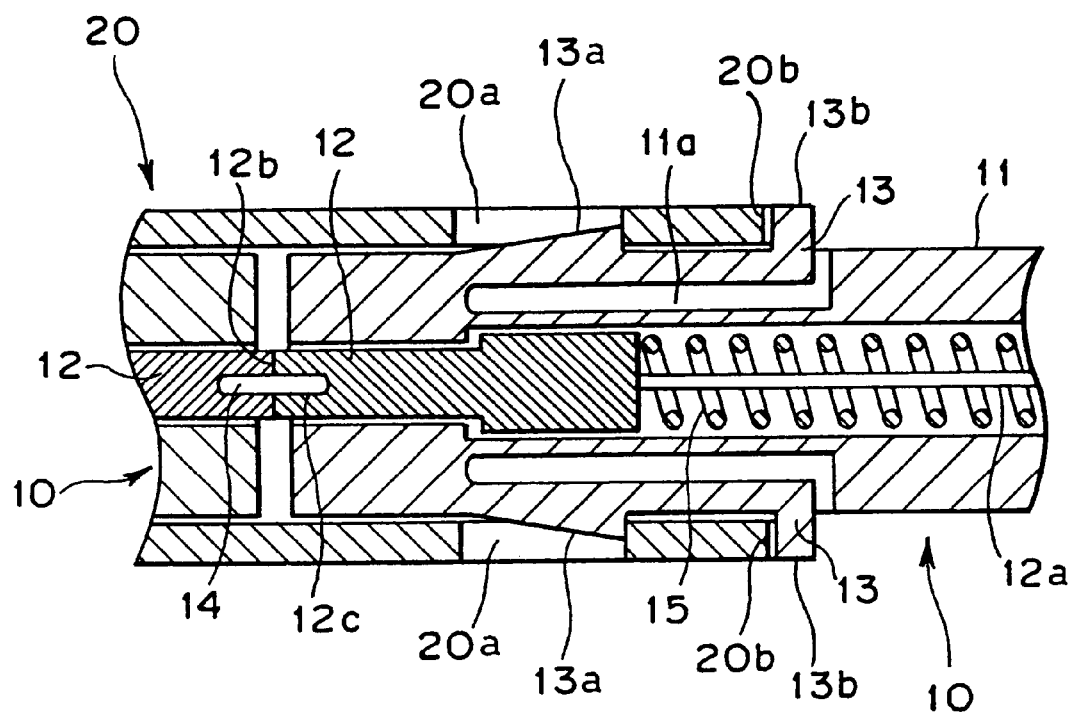
FIG. 4 is a longitudinal cross section of the first embodiment of the optical connector in the connected state.

In the optical connector of the above construction, when the connector plugs 10 are inserted into the adapter 20 from both ends as shown in FIG. 3, the optical fiber end faces 12b of the ferrules 12 of the opposing connector plugs 10 contact each other, connecting the optical fibers 12a of the connector plugs 10.

At this time, the optical fiber end faces 12b of the opposing connector plugs 10 are precisely aligned in position by the guide pins 14, as in the MT type and MPO type connectors, so that a connection characteristic with low loss can be obtained.

Further, because the ferrules 12 are urged toward each other by the springs 15, the optical fiber end faces 12b can be kept in secure contact with each other.

The connector plugs 10 inserted in the adapter 20 are held therein by the elastic engagement pieces 13 engaging the holes 20a of the adapter 20. That is, when the connector plug 10 is inserted into the adapter 20, the inclined surfaces of the engagement portions 13a engage and slide on the inner surface of the adapter 20 while at the same time the elastic engagement pieces 13 are elastically deformed (deflected) inwardly (see FIG. 4). Then, when the engagement portions 13a of the elastic engagement pieces 13 reach the holes 20a, they snap into the holes 20a of the adapter 20 allowing the elastic engagement pieces 13 to recover from the elastic deformation.

At this time, a locking engagement between the vertical surfaces of the engagement portions 13a and the holes 20a prevents the movement of the connector plug 10 in a direction opposite the insertion direction. Because the connector plug 10 is locked in the adapter 20 with the engagement portions 13a of the elastic engagement pieces 13 completely accommodated in the holes 20a, i.e., with the engagement portions 13a not protruding from the holes 20a, the connector plug 10 is prevented from becoming disconnected inadvertently as a result of contact with external objects. Further, because the press portions 13b of the elastic engagement pieces 13 are received in the receptor portions 20b of the adapter 20, the press portions 13b of the elastic engagement pieces 13 do not protrude outwardly from the surface of the adapter 20. This prevents the press portions 13b from getting entangled with cables or the like.

When the connector plug 10 is to be disconnected from the adapter 20, the press portions 13b of the elastic engagement pieces 13 are pressed as by finger tips in a direction almost perpendicular to the plug insertion direction. That is, the paired press portions 13b are pushed toward each other. This causes the engagement portions 13a of the elastic engagement pieces 13 to disengage from the holes 20a of the adapter 20. In this condition, the connector plug 10 is pulled out of the adapter 20 to separate it from the adapter 20.

As described above, in the optical connector shown in FIGS. 1 to 4, the connector plug 10 is locked in the adapter 20 by a plurality of elastic engagement pieces 13 (in this case, two elastic engagement pieces). This structure ensures that the connected state is not disturbed inadvertently as by contact with external objects, thus improving reliability. In addition, because the press portions 13b of the connector plug 10 are received in the receptor portions 20b of the adapter 20, entanglement between the press portions 13b and cables or the like can be avoided.

(Second Embodiment)

Figure 5:
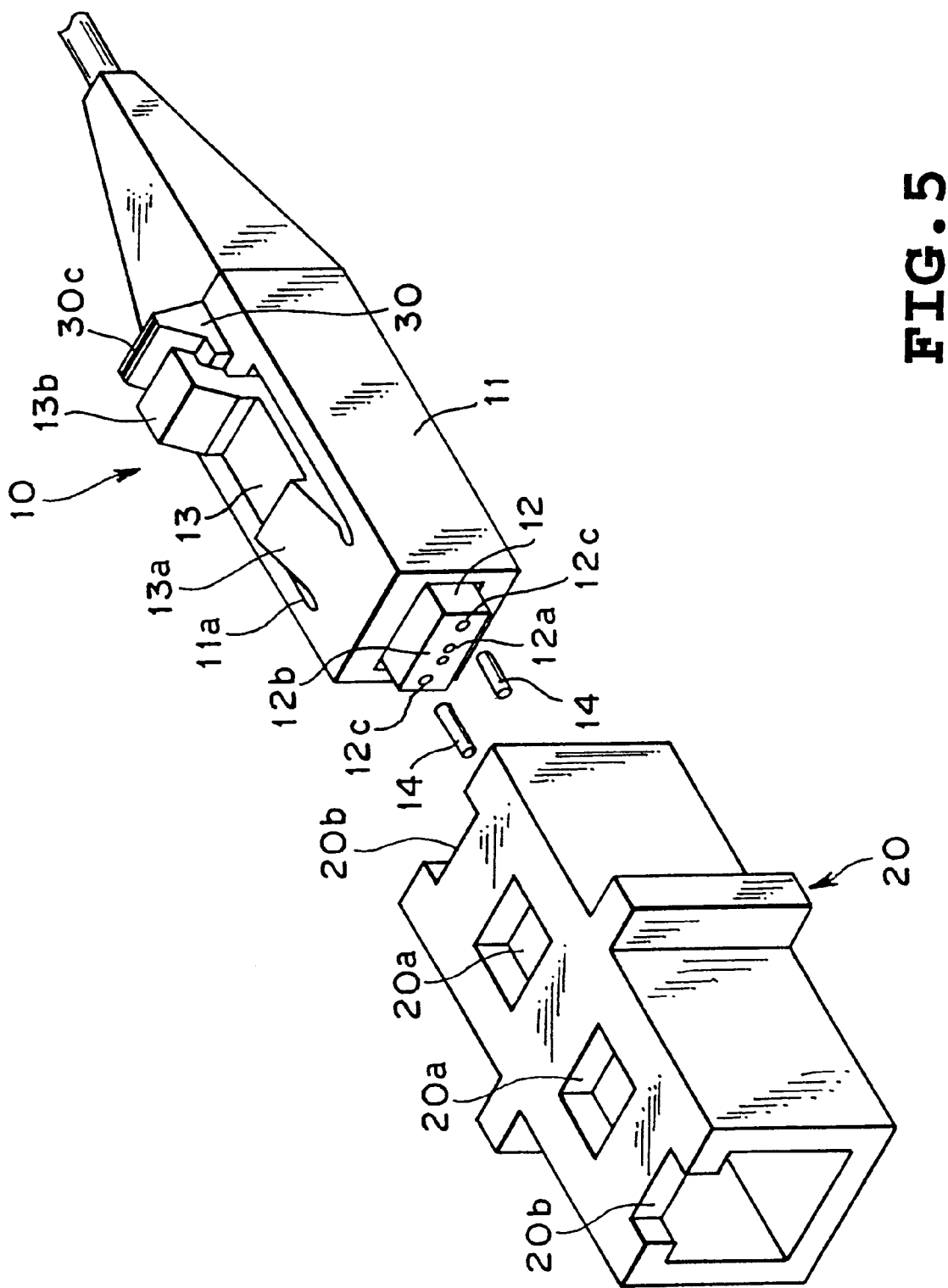
FIG. 5 is a perspective view of an optical connector according to a second embodiment of the invention.

FIGS. 5 to 11 represent a second embodiment of the invention. FIG. 5 is a perspective view of an optical connector, FIG. 6 a side cross section of the optical connector, FIG. 7 a partial front cross section of a connector plug, FIG. 8 a perspective view of the optical connector in a connected state, FIGS. 9 and 10 side cross sections of the optical connector, and FIGS. 11A and 11B partial plan views of the connector plug.

The second embodiment of the optical connector shown in these figures, as in the preceding first embodiment, comprises a pair of connector plugs 10 and an adapter 20. The mating connector plugs 10 are connected together by inserting them into the ends of the adapter 20.

The connector plug 10 has a housing 11 rectangular in cross section, a ferrule 12 accommodated in the housing 11, an elastic engagement piece 13 formed integral with one side surface of the housing 11, and a stopper (locking key) 30 restricting the movement of the elastic engagement piece 13.

In the second embodiment of the optical connector, the elastic engagement piece 13 is provided only on one side (in this case, on the upper side in the figure) of the connector plug 10. To conform with this structure, the adapter 20 has formed on only one side (in this case, on the upper side in the figure) the holes 20a for engaging the engagement portions 13a of the elastic engagement pieces 13 and the receptor portions 20b for receiving the press portions 13b of the elastic engagement pieces 13.

Further, the second embodiment is provided with the stopper 30 that restricts the movement of the elastic engagement piece 13.

These are the main points in which the second embodiment differs from the first embodiment. In these embodiments, constitutional elements realizing the same functions are assigned the identical reference numerals and their explanations are not repeated.

Figure 7:
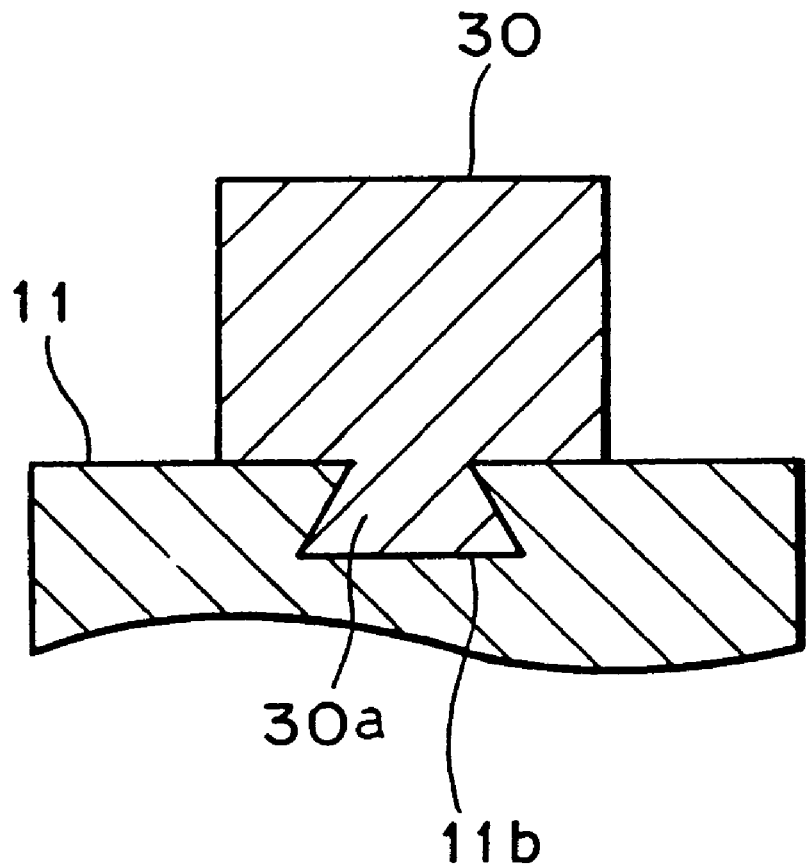
FIG. 7 is a partial vertical cross section of a stopper in the second embodiment of the optical connector.

The stopper 30 is mounted on the connector plug 10 behind the elastic engagement piece 13 (FIG. 5) and, as shown in FIG. 7, has a projected portion 30a on its underside which is slidably fitted in a groove 11b formed in the housing 11. The stopper 30 mounted on the housing 11 therefore is slidable in the longitudinal direction of the connector plug 10.

The stopper 30 has a restriction body 30b on the front end side that restricts the movement of the press portion 13b of the elastic engagement piece 13 toward the housing body 11 (i.e., toward the inside). The stopper 30 also has an operation portion 30c trapezoidal in cross section behind the restriction body 30b. An operator touches the operation portion 30c with a finger to move the stopper 30.

Figure 6:
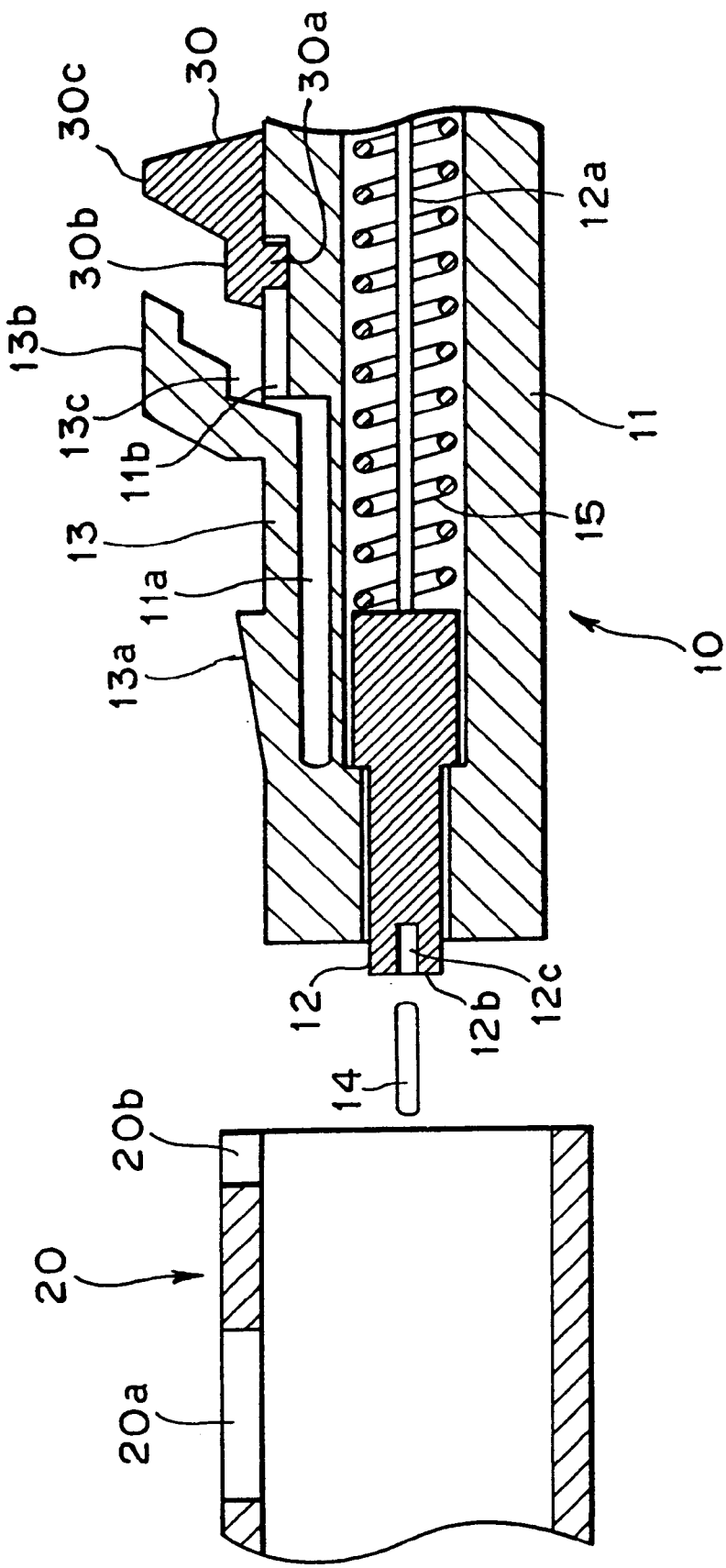
FIG. 6 is a longitudinal cross section of the second embodiment of the optical connector.
Figure 9:
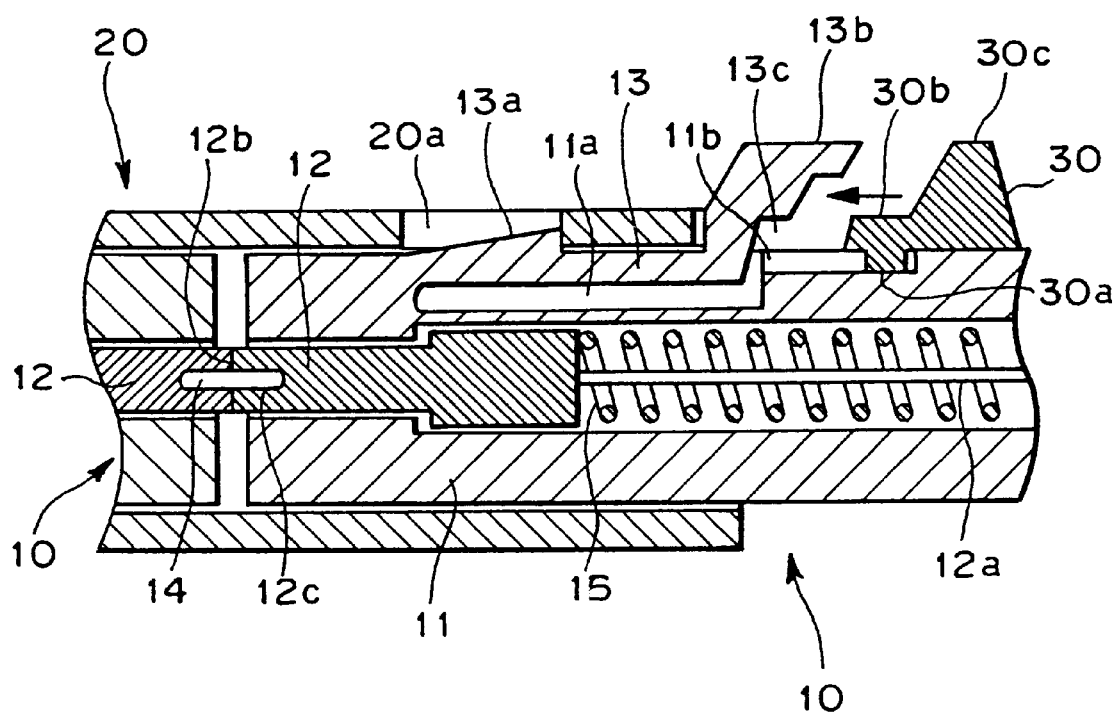
FIG. 9 is a longitudinal cross section of the second embodiment of the optical connector in the connected state.

Below the press portion 13b of the elastic engagement piece 13 is formed a groove 13c, as shown in FIG. 6 or 9. When the stopper 30 is moved toward the elastic engagement piece 13, the restriction body 30b fits into the groove 13c, thus restricting the push-down operation of the elastic engagement piece 3.

The operation portion 30c has a height almost equal to that of the press portion 13b of the elastic engagement piece 13. When the stopper 30 is moved to the elastic engagement piece 13, the upper surfaces of the press portion 13b and the operation portion 30c form a continuous flat surface. The surface of the operation portion 30c is formed with a plurality of grooves 30d for slippage prevention while moving the stopper 30.

Figure 11A:
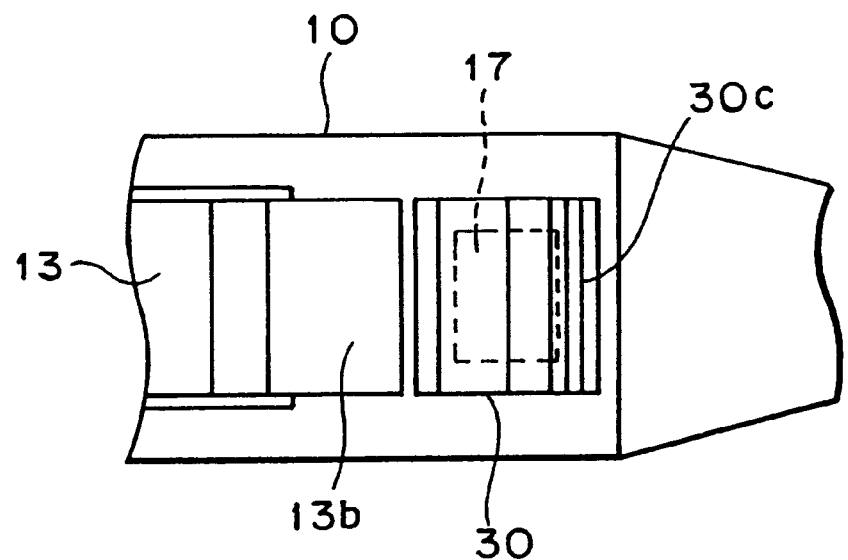
FIGS. 11A and 11B are plan views showing the stopper and its associated part of the second embodiment of the optical connector.
Figure 11B:
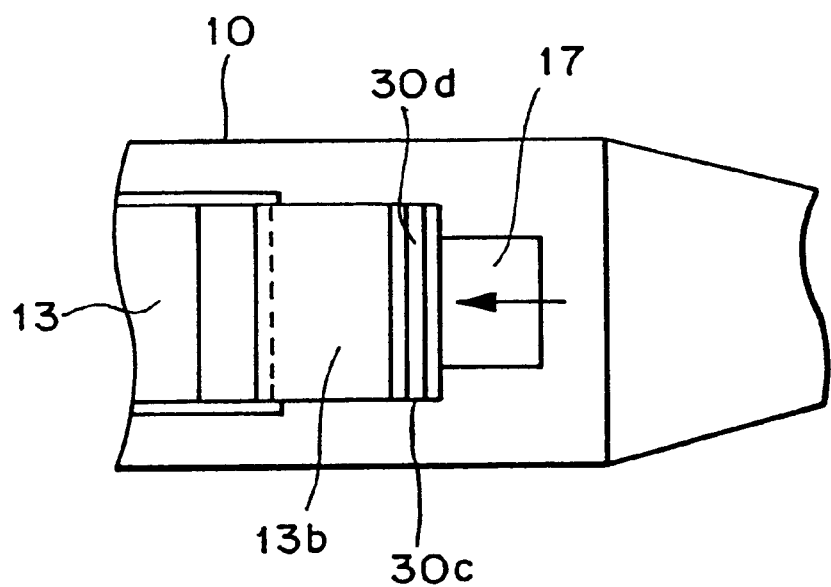

Further, as shown in FIGS. 11A and 11B, the surface of the housing 11 is provided with an indicator portion 17 which is exposed when the stopper 30 is moved toward the elastic engagement piece 13 and, when the stopper 30 is moved in the opposite direction, is covered by the stopper 30. The indicator portion 17 is painted with a color different from the color of the housing 11. By checking the exposed indicator portion 17, the operator can instantly know whether the stopper 30 is at the locking position or not.

Figure 8:
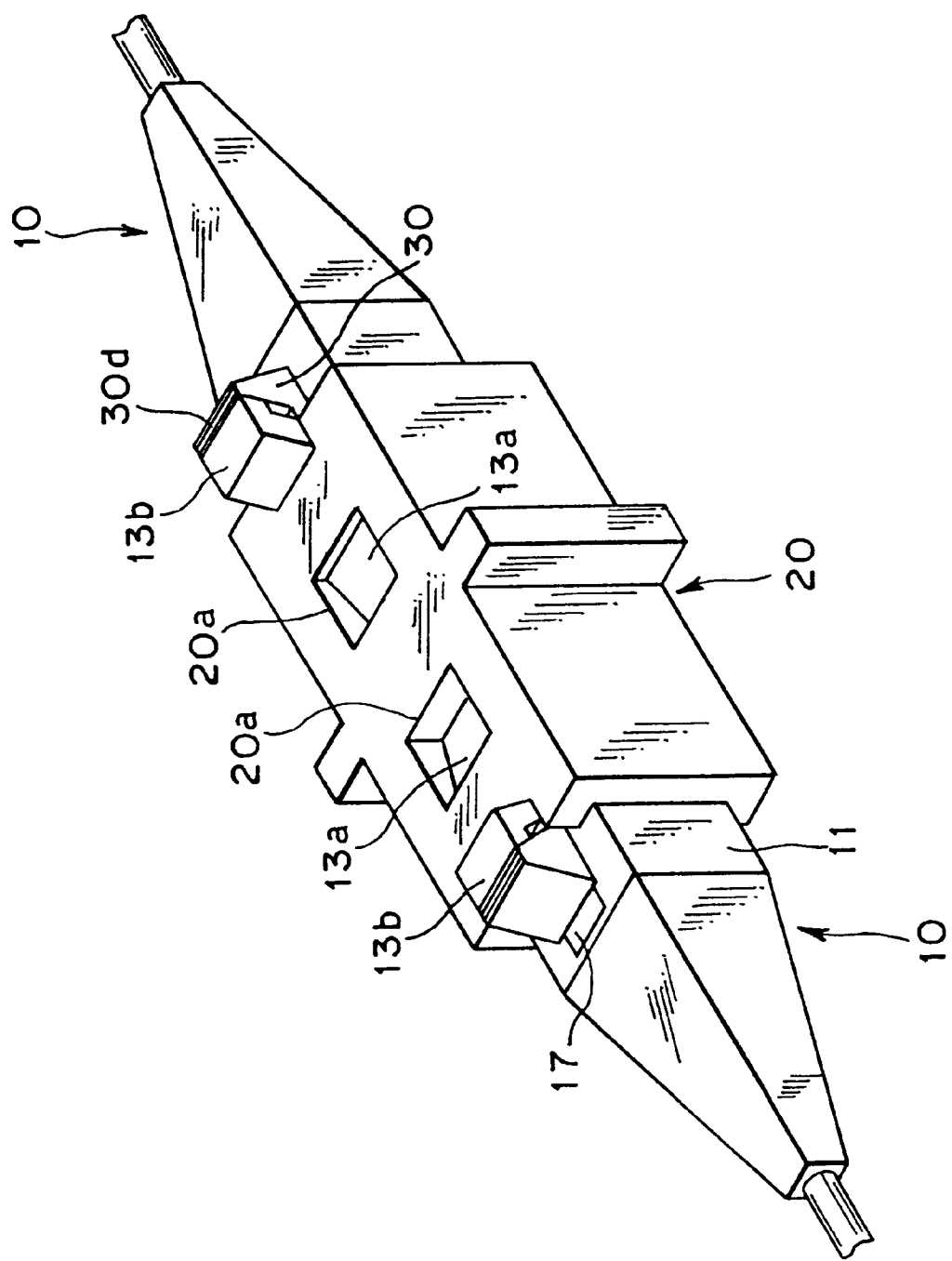
FIG. 8 is a perspective view of the second embodiment of the optical connector in a connected state.

In the optical connector constructed as described above, when the connector plugs 10 are inserted into the ends of the adapter 20 as shown in FIG. 8, the ferrules 12 of the mating connector plugs 10 contact each other, connecting the optical fibers 12a of the mating connector plugs 10 as shown in FIG. 9.

At this time, the optical fiber end faces 12b of the mating connector plugs 10 are precisely aligned in position by the guide pins 14 as in the MT type and MPO type connectors, so that a connection characteristic with little loss can be obtained.

Further, because the ferrules 12 are urged toward each other by the springs 15, the optical fiber end faces 12b can be kept in secure contact with each other.

The connector plugs 10 inserted in the adapter 20 are held therein by the engagement portions 13a of the elastic engagement pieces 13 engaging the holes 20a of the adapter 20. That is, when the connector plug 10 is inserted into the adapter 20, the inclined surface of the engagement portion 13a engages and slides on the inner surface of the adapter 20 while at the same time the elastic engagement piece 13 is elastically deformed (deflected) inwardly (see FIG. 12B). Then, when the engagement portion 13a of the elastic engagement piece 13 reaches the hole 20a, it fits into the hole 20a of the adapter 20 allowing the elastic engagement piece 13 to recover from the elastic deformation. A locking engagement between the vertical surface of the engagement portion 13a and the hole 20a prevents the movement of the connector plug 10 in a direction opposite the insertion direction.

Figure 10:
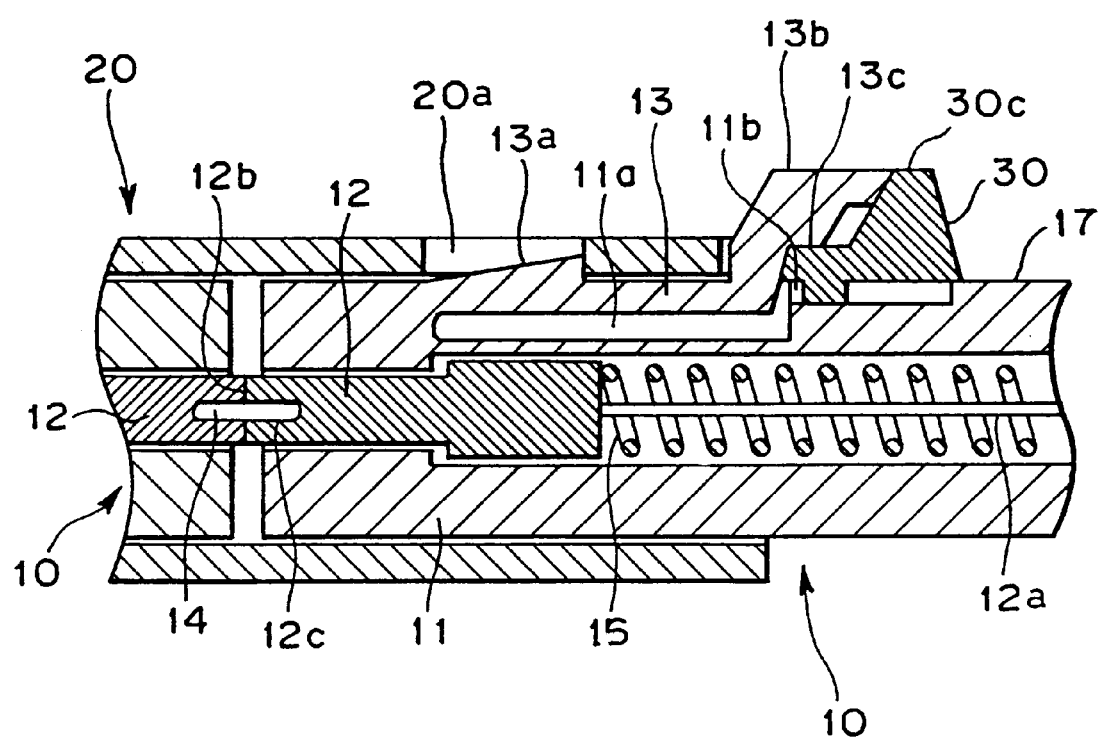
FIG. 10 is a longitudinal cross section of the second embodiment of the optical connector.

Next, when the stopper 30 of the connector plug 10 is moved toward the elastic engagement piece 13 as shown in FIG. 10, the restriction body 30b of the stopper 30 is inserted into the groove 13c formed under the press portion 13b of the elastic engagement piece 13. As a result, the push-down operation of the elastic engagement piece 13 (i.e., downward motion of the piece 13) is blocked. Hence, the connected state is not disturbed inadvertently as by contact with external objects.

At this time, because the movement of the stopper 30 toward the elastic engagement piece 13 exposes, as shown in FIGS. 11A and 11B, the indicator portion 17 which has a color different from that of the housing 11, the operator can easily recognize the locked state of the stopper 30 by sight.

In the locked state, the press portion 13b of the elastic engagement piece 13 and the operation portion 30c of the stopper 30 form a continuous surface and therefore an integral geometry with few undulations. This prevents them from getting entangled with cables or the like.

When the connector plug 10 and the adapter 20 are to be disconnected, the following steps are taken. First, when the stopper 30 is moved in a direction opposite the elastic engagement piece 13, i.e., rearward, the restriction body 30b is pulled out of the groove 13c formed below the press portion 13b, thereby unlocking the elastic engagement piece 13 that was locked by the stopper 30.

Next, the press portion 13b of the elastic engagement piece 13 is pressed by finger tip to disengage the engagement portion 13a of the elastic engagement piece 13 from the hole 20a of the adapter 20. In this condition, the connector plug 10 is pulled out of the adapter 20. As a result, the connector plug 10 is separated from the adapter 20.

With the second embodiment of the optical connector, which has a construction in which the connector plug 10 is locked in the adapter 20 by the elastic engagement piece 13 and unlocked by pressing the elastic engagement piece 13, because the stopper 30 that restricts the push-down operation of the elastic engagement piece 13 is provided, the connected state is protected against being disturbed inadvertently from the contact with external objects, thus improving the reliability of the optical connector. Further, because, when the stopper 30 is set in a locking position, the press portion 13b of the elastic engagement piece 13 and the operation portion 30c of the stopper 30 together form a continuous surface with few undulations, they can be prevented from getting entangled with cables or the like.

Figure 12A:
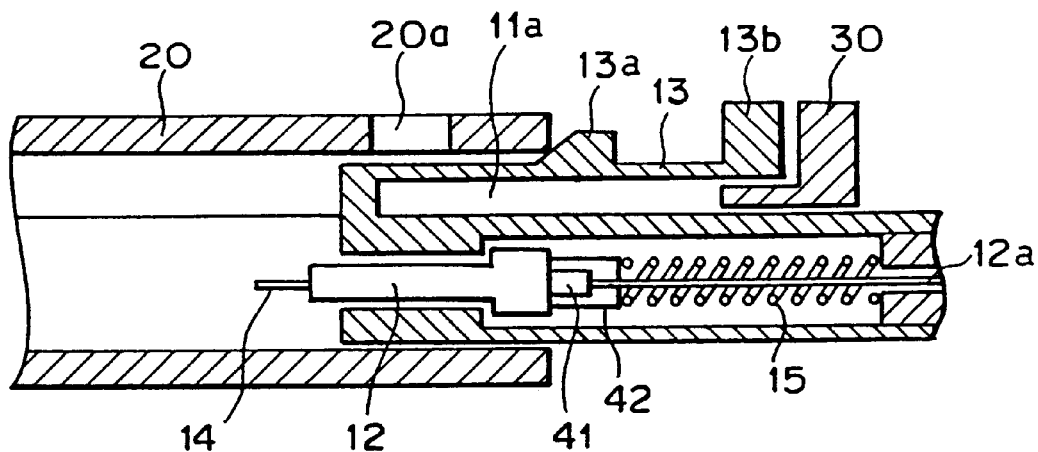
FIGS. 12A to 12C are longitudinal cross sections sequentially showing how the connector plug is inserted into the adapter.
Figure 12B:
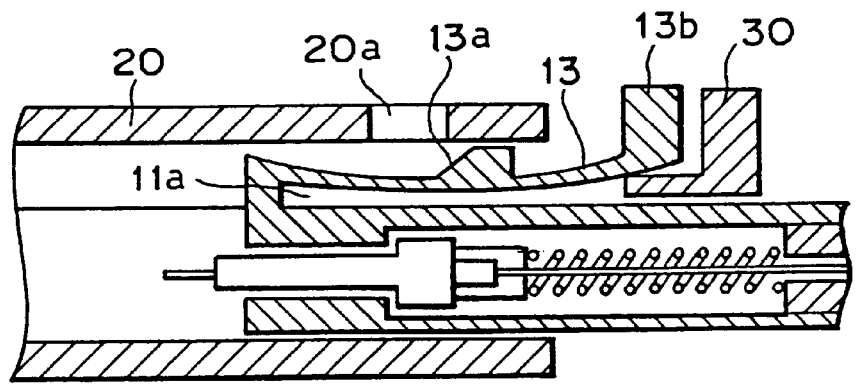
Figure 12C:
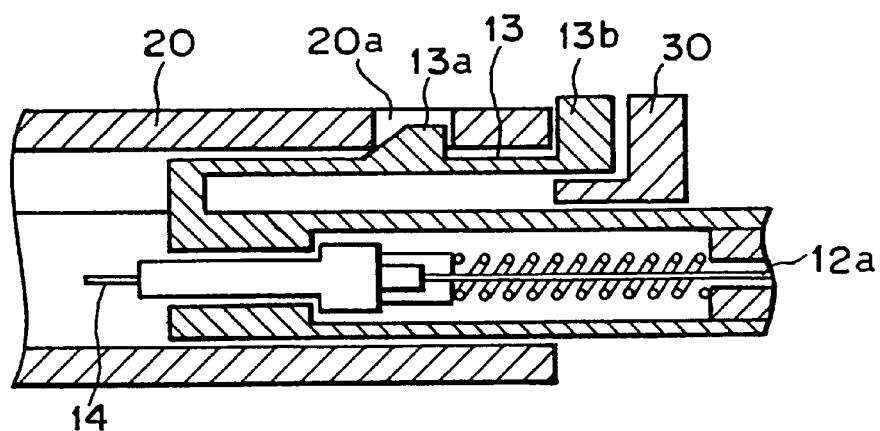

FIGS. 12A to 12C show the action of each component in the second embodiment when the connector plug 10 is inserted into the adapter 20. The embodiment in FIGS. 12A–12C is different from the second embodiment shown in FIGS. 5–11 in that even when the elastic engagement piece 13 is locked by the stopper 30, the elastic engagement piece 13 can be deflected at its central portion into the groove (space) 11a formed inside the elastic engagement piece 13 as shown in FIG. 12B.

In FIGS. 12A to 12C, a boot body 41 is provided at the rear end of the ferrule 12. The boot body is for instance made of rubber or the like. Two optical fibers 12a are covered by the ferrule 12 and the boot body 41. The boot body 41 is enclosed by a spring engagement body 42, against which a spring 15 is pressed to urge the ferrule 12 outwardly (toward a pin 14).

In FIGS. 12A to 12C, the stopper 30 is moved in advance to a position where it locks the movement of the elastic engagement piece 13. In this locked state, the connector plug 10 is inserted into the adapter 20.

Even when the elastic engagement piece 13 is locked by the stopper 30, the elastic engagement piece 13 can be elastically deformed, i.e., deflected into the groove 11a formed inside the elastic engagement piece 13 as shown in FIG. 12B, so the connector plug 10 can advance into the adapter 20. Then, when the engagement portion 13a of the elastic engagement piece 13 reaches the hole 20a of the adapter 20, the engagement portion 13a fits into the hole 20a of the adapter 20 allowing the elastic engagement piece 13 to recover from the elastic deformation.

In this case, because the stopper 30 is set in a locking position in advance, there is no need to move the stopper 30 after inserting the connector plug 10 into the adapter 20.

FIGS. 13A to 13C and 14 represent variations of the stopper 30 used in the preceding second embodiment.

In the stoppers 30 shown in FIGS. 13A to 13C and 14, a lock mechanism is provided that locks the movement of the stopper 30 itself.

In FIGS. 13A to 13C, FIG. 13B and 13C are cross sections taken along the line D—D of FIG. 13A, with FIG. 13B representing a state before being locked and FIG. 13C representing a state after being locked.

The stopper 30, like the one shown in FIGS. 5 to 11, has an upwardly projecting operation portion 30c and a restriction body (stopper body) 30b that advances under the press portion 13b of the elastic engagement piece 13 to restrict the movement of the press portion 13b. That is, when the stopper 30 slides to the locking position, the restriction body 30b fits into the groove 13c under the press portion 13b of the elastic engagement piece 13.

The stopper 30 has a pair of projecting guide bodies 36 at its sides that fit in grooves 35 formed in the housing 11 of the connector plug 10. The projecting guide bodies 36 are guided by the grooves 35 as the stopper 30 moves. The projecting guide bodies 36 have a protrusion 37 at their front end, which fits into a recess 38 formed at the end of each groove 35. Thus, when the stopper 30 has moved to the end position, the protrusions 37 engage the recesses 38, locking the movement of the stopper 30.

Figure 14A:
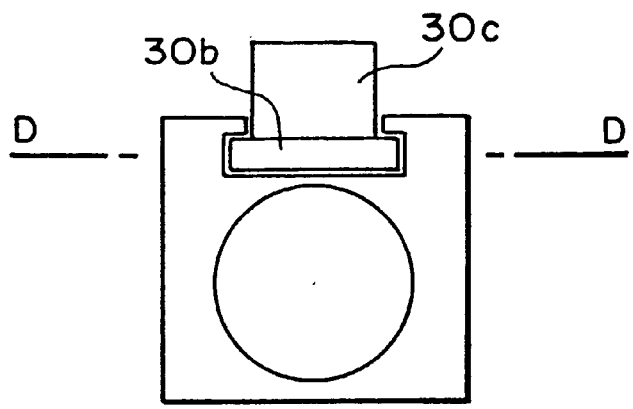
FIGS. 14A to 14C are diagrams showing another example of a stopper locking mechanism.
Figures 14B, 14C:
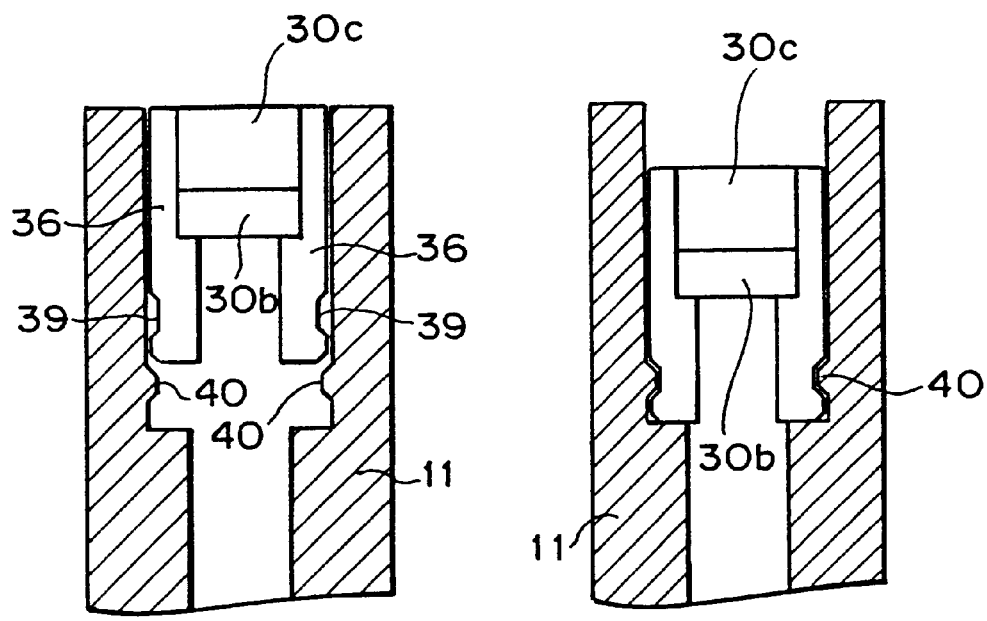

Next, in FIGS. 14A to 14C, FIGS. 14B and 14C are cross sections taken along the line D—D of FIG. 14A, with FIG. 14B representing a state before being locked and FIG. 14C representing a state after being locked.

In FIGS. 14A to 14C, the projecting guide bodies 36 of the stopper 30 are each formed with a recess 39 near the front end, and a raised portion 40 is formed in each of the grooves 35 of the housing 11. The movement of the stopper 30 is locked by the engagement between the raised portion 40 and the recess 39.

Although in the first and second embodiments the optical fibers 12a incorporated in a pair of connector plugs 10 are optically connected by connecting the pair of connector plugs through the adapter 20, the optical connectors shown in these embodiments may be applied to the connection between a patch cord and an outlet, between a patch cord and an inlet, or between a patch cord and a patch panel.

Figure 15:
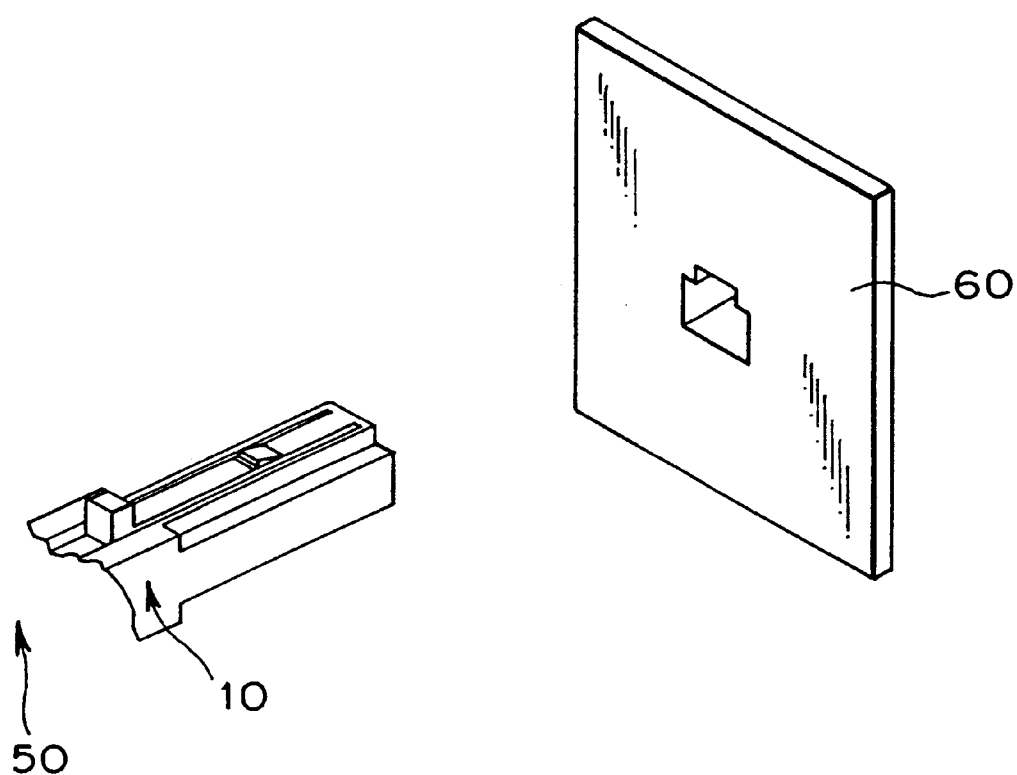
FIG. 15 is a perspective view of the connector of the invention as applied to an outlet.

FIG. 15 shows an outlet connection. The front end of a patch cord 50 is attached with the connector plug 10 of the above embodiments, and an outlet 60 like the adapter 20 is formed with a recess or through-hole that receives the engagement portion 13a of the elastic engagement piece 13 of the connector plug 10.

In such a mode of use of the optical connector, the optical connector of the present invention can be applied to simply connecting a single connector plug incorporating a single- or multi-core optical fiber to an adapter. That is, the adapter 20 of the optical connector that applies the present invention is not limited to a type in which a pair of connector plugs 10 are inserted into the adapter 20 from both ends, and may be of a type in which only one connector plug 10 is inserted.

Figure 16:
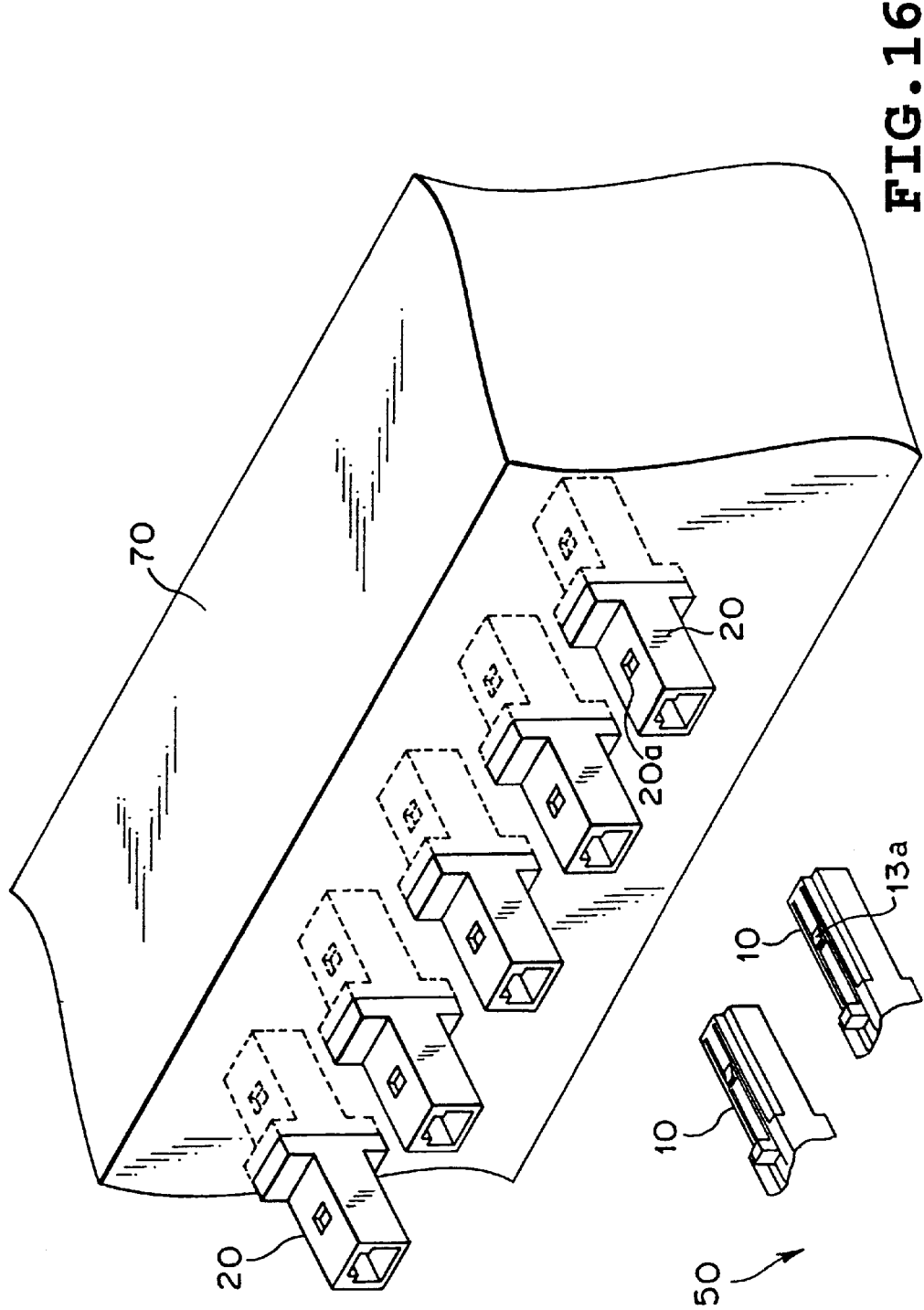
FIG. 16 is a perspective view of the connector of the invention as applied to a patch panel.
Figure 17:
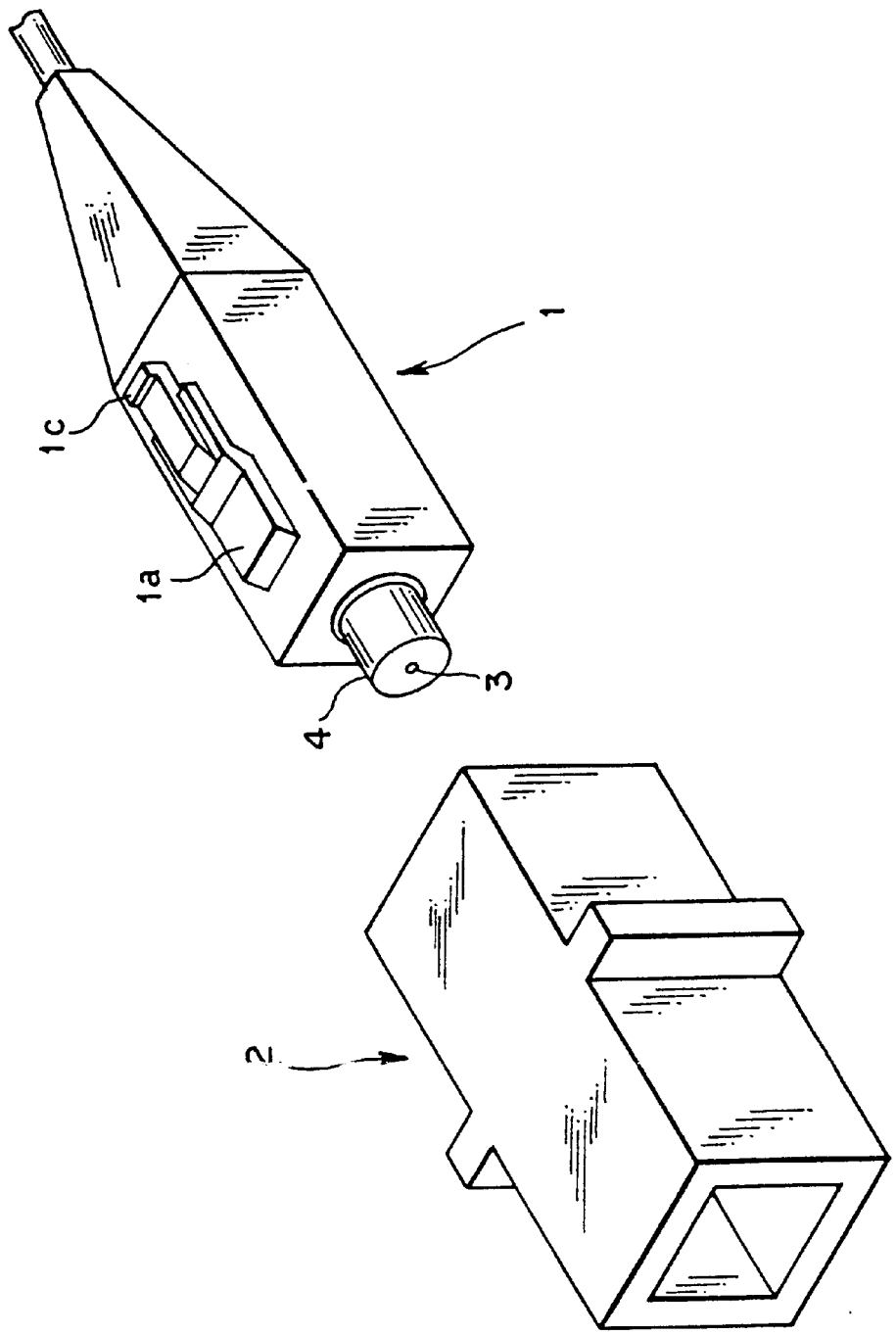
FIG. 17 is a perspective view of a conventional optical connector.

FIG. 16 shows a patch panel connection. The front end of each of the patch cords 50 is attached with the connector plug 10 of the invention, and the patch panel 70 has a row of adapters 20 which realize the function identical with that of the adapter 20 described above and which are formed with a hole 20a for engaging the engagement portion 13a of the elastic engagement piece 13 of the connector plug 10.

In this use of the patch panel, it is also possible to employ a construction in which the connector plugs 10 of the present invention can connect to the adapters 20 projecting from one side of the panel 70 (on the side shown with a solid line in FIG. 16) while the adapters 20 projecting from the other side of the panel can receive a different type of connector plugs other than those of the invention.

While we have described some preferred embodiments, the present invention may incorporate various modifications without departing from the scope of appended claims.

For example, although the second embodiment establishes connection between the plug 10 and the adapter 20 by the engagement between one elastic engagement piece 13 on the plug side and one hole 20a on the adapter side, it is possible to use a plurality of sets of the elastic engagement piece 13 and the hole 20a, as in the first embodiment.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A connector plug which can be removably snap-fitted into an adapter having a cavity therein for receiving the connector plug and holes for locking the connector plug, the connector plug comprising:

at least one optical fiber;

a ferrule for holding the optical fiber so that each end face of said optical fiber is exposed;

a housing for receiving the ferrule and the fiber; and a plurality of elastic engagement pieces extending from a plurality of locations on the housing, the elastic engagement pieces each having a projecting engagement portion, the projecting engagement portions snapable into the holes of the adapter and become locked there when the connector plug is inserted into the adapter;

wherein the elastic engagement pieces extend in an axial direction of the optical fiber, and spaces for the elastic engagement pieces to elastically deform are formed between a back surface of each of the elastic engagement pieces and the housing;

wherein the engagement portions are each formed with a tapered surface whose projection height progressively decreases toward the plug insertion direction;

wherein the elastic engagement pieces are each formed with a projecting press portion at a rear end portion thereof which is pressed to elastically deform the elastic engagement piece toward its back surface side to unlock the engagement portion of the elastic engagement piece from the hole of the adapter; and wherein a projection height of the press portion is so set that when the connector plug is inserted into the adapter, the projection height of the press portion is almost flush with a surface of the housing of the adapter.

2. A connector plug as claimed in claim 1, wherein the adapter is provided with receptor portions that receive the press portions of the elastic engagement pieces by enclosing the press portions around their circumference, and the projection height of the press portion is set almost equal to the height of the receptor portion.

3. A connector plug which can be removably snap-fitted into an adapter having a cavity therein for receiving the connector plug and holes for locking the connector plug, the connector plug comprising:

at least one optical fiber, a ferrule for holding the optical fiber so that each end face of said optical fiber is exposed;

a housing for receiving the ferrule and the fiber;

an elastic engagement piece extending from the housing, the elastic engagement piece having a projecting engagement portion and a projecting press portion that can be pressed, the projecting engagement portion snapable into the hole of the adapter and become locked there when the connector plug is inserted into the adapter; and a stopper having an operation portion for locking the press portion of the elastic engagement piece from being pressed;

wherein, in a state where the press portion is not locked by the stopper, the press portion is pressed to unlock the engagement portion of the elastic engagement piece from the hole.

4. A connector plug as claimed in claim 3, wherein the stopper can be moved between a locking position where the press portion is locked from being pressed and an unlocking position where it is unlocked, and further comprising a stopper locking means which locks the movement of the stopper when the stopper is located at the locking position.

5. A connector plug as claimed in claim 3, wherein the elastic engagement piece extends in an axial direction of the optical fiber, and a space for the elastic engagement piece to elastically deform is formed between a back surface of the elastic engagement piece and the housing.

6. A connector plug as claimed in claim 5, wherein the engagement portion is formed with a tapered surface whose projection height progressively decreases toward the plug insertion direction.

7. A connector plug as claimed in claim 5, wherein the press portion is formed at a rear end portion of the elastic engagement piece, and the press portion is pressed to elastically deform the elastic engagement piece toward its back surface side to unlock the engagement portion of the elastic engagement piece from an engaged portion of the adapter.

8. A connector plug as claimed in claim 7, wherein the press portion is so shaped as to form a groove between the press portion and the housing; the stopper can be moved on the housing in plug connection and disconnection directions, and has a stopper body that fits into the groove and a projecting operation portion that can be operated; and when the stopper is moved toward the press portion, the stopper body fits into the groove to lock the movement of the press portion, and when the stopper is moved in a direction opposite the press portion, the stopper body is disengaged from the groove to unlock the press portion.

9. A connector plug as claimed in claim 7, further comprising a stopper locking means which locks the movement of the stopper when the stopper is located at a locking position where it locks the movement of the press portion.

10. A connector plug as claimed in claim 9, wherein the press portion of the elastic engagement piece and the operation portion of the stopper are formed so that the heights of the press portion and the operation portion are equal and that when the stopper is moved to the elastic engagement piece, the press portion and the operation portion together form an almost continuous surface.

11. A connector plug as claimed in claim 8, wherein the operation portion of the stopper is provided with a means for preventing of slippage during the movement of the stopper.

12. A connector plug as claimed in claim 8, wherein an indicator portion that indicates whether or not the press portion that indicates whether or not the press portion is locked by the stopper is provided at such a display position on the housing that when the stopper is moved toward the press portion, the indicator portion is exposed and when it is moved in a direction opposite the press portion, the indicator portion is concealed under the stopper.

13. A connector plug as claimed in claim 9, wherein the operation portion of the stopper is provided with a means for preventing slippage during the movement of the stopper.

14. A connector plug as claimed in claim 10, wherein the operation portion of the stopper is provided with a means for preventing slippage during the movement of the stopper.

15. A connector plug as claimed in claim 9, wherein an indicator portion that indicates whether or not the press portion is locked by the stopper is provided at such a display position on the housing that when the stopper is moved toward the press portion, the indicator portion is exposed and when it is moved in a direction opposite the press portion, the indicator portion is concealed under the stopper.

16. A connector plug as claimed in claim 10, wherein an indicator portion that indicates whether or not the press portion is locked by the stopper is provided at such a display position on the housing that when the stopper is moved toward the press portion, the indicator portion is exposed and when it is moved in a direction opposite the press portion, the indicator portion is concealed under the stopper.

* * * * *

UNITED STATES PATENT AND TRADEMARK OFFICE
CERTIFICATE OF CORRECTION

PATENT NO. : 6,290,527 B1  
DATED : September 18, 2001  
INVENTOR(S) : Masaaki Takaya and Shinji Nagasawa Page 1 of 1

It is certified that error appears in the above-identified patent and that said Letters Patent is hereby corrected as shown below:

<u>Title page,</u>
Item [54] Title, change "NIPPON TELEGRAPH AND TELEPHONE CORPORATION" to -- MODULAR JACK TYPE MINI-MT CONNECTOR --.

Signed and Sealed this

Fourteenth Day of May, 2002

*Attest:*

JAMES E. ROGAN
*Attesting Officer*                *Director of the United States Patent and Trademark Office*